United States Patent
Ueki et al.

(10) Patent No.: US 8,274,768 B2
(45) Date of Patent: Sep. 25, 2012

(54) INVERTER DEVICE

(75) Inventors: Kenichiro Ueki, Mie-ken (JP); Takao Ichihara, Mie-ken (JP)

(73) Assignee: Fuji Electric Co., Ltd., Kawasaki-Shi (JP)

( * ) Notice: Subject to any disclaimer, the term of this patent is extended or adjusted under 35 U.S.C. 154(b) by 204 days.

(21) Appl. No.: 12/801,379

(22) Filed: Jun. 7, 2010

(65) Prior Publication Data

US 2010/0309589 A1    Dec. 9, 2010

(30) Foreign Application Priority Data

Jun. 8, 2009   (JP) .................. 2009-136878

(51) Int. Cl.
*H02V 1/04* (2006.01)
(52) U.S. Cl. .......................... 361/23; 361/31
(58) Field of Classification Search ............ 361/18, 361/23, 31, 33
See application file for complete search history.

(56) References Cited

U.S. PATENT DOCUMENTS

2002/0089321 A1* 7/2002 Matsuda ................ 324/142
2006/0113838 A1* 6/2006 Iwagami et al. .......... 307/1

FOREIGN PATENT DOCUMENTS

JP    H09-238476    9/1997

* cited by examiner

*Primary Examiner* — Danny Nguyen
(74) *Attorney, Agent, or Firm* — Manabu Kanesaka

(57) ABSTRACT

The inverter device includes an IGBT bridge circuit, a drive block which has an upper arm photocoupler and a lower arm photocoupler, and a control block including a CPU which generates gate signals and supplies them to the photocouplers. The control block includes an upper arm shutdown circuit and lower arm shutdown circuit which individually shutdown the gate signals of the upper arm and lower arm IGBTs in accordance with shutdown signals input from the exterior, and the shutdown circuits carry out a shutdown operation in accordance with the shutdown signals, which have mutually inverted logics.

5 Claims, 6 Drawing Sheets

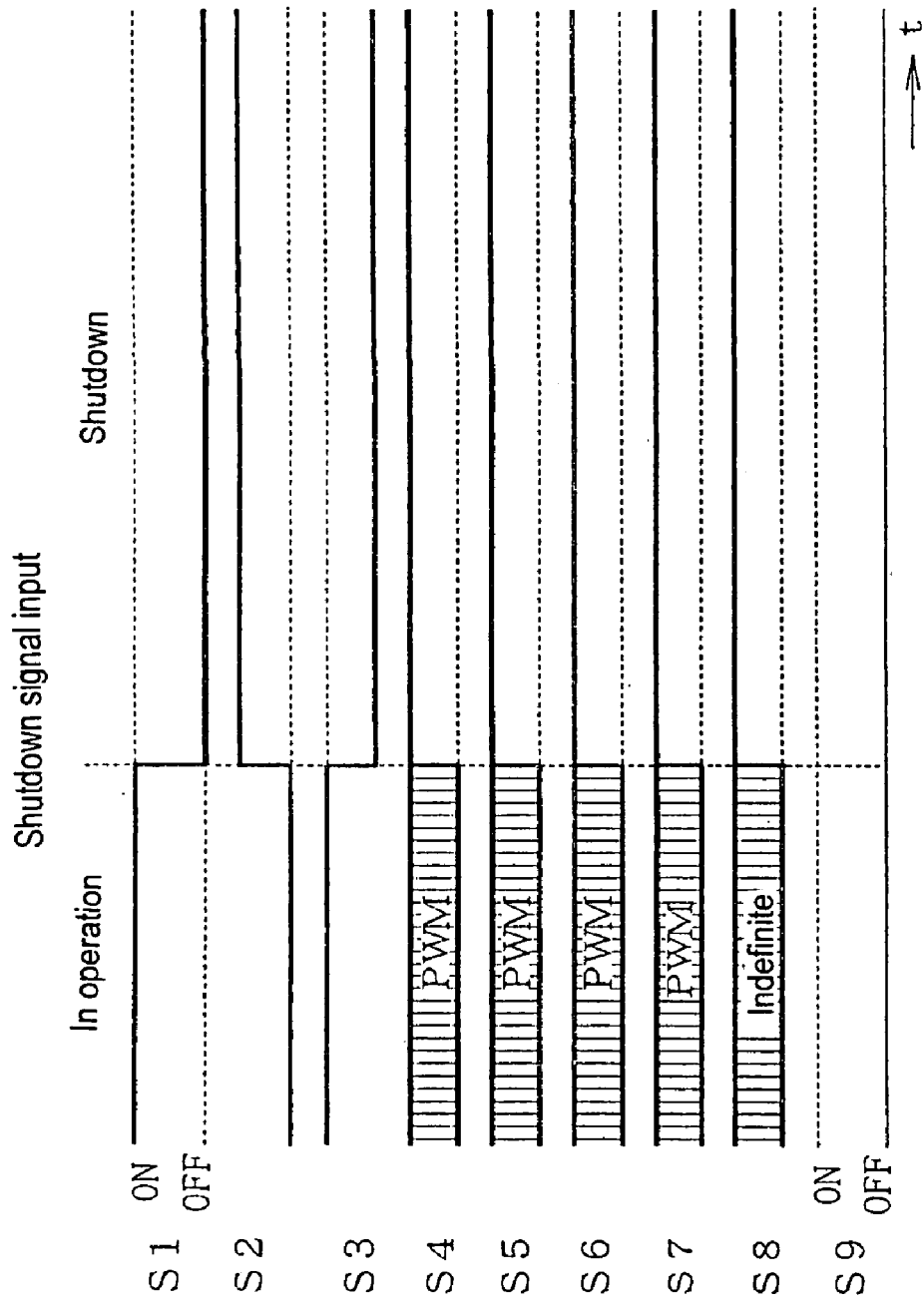

INVERTER DEVICE

BACKGROUND OF THE INVENTION AND RELATED ART STATEMENT

The present invention relates to an inverter device and more particularly to an inverter device having the redundancy of a function, i.e. multiple safety function, which shutdowns a drive signal of a semiconductor switching element.

European Norm "EN954-1" (ISO13849-1) is known as the basic safety standard of a mechanical device. With the European Norm "EN954-1", as shown in Table 1, safety requirement items demanded of a mechanical device and system behavior corresponding to that requirement items are classified by category.

For example, category "3" of Table 1 stipulates, in addition to the requirement of category "1", that a design should be such as to provide redundancy in order that a safety function is not impaired due to a single failure.

TABLE 1

| Category | Requirements (in brief) | System Behavior |
|---|---|---|
| B | Safety related parts of machine control systems and/or their protective equipment, as well as their components, shall be designed, constructed, selected, assembled and combined in accordance with relevant standards so that they can withstand the expected influence. Basic safety principles shall be applied. | When a fault occurs, it can lead to a loss of the safety function. |
| 1 | The requirements of category B apply together with the use of well tried safety components and safety principles. | As described in category B but with higher safety related reliability of the safety related function. (The higher the reliability, the lesser the likelihood of a fault). |
| 2 | The requirements of category B and the use of well tried safety principles apply. The safety function(s) shall be checked at machine start-up and periodically by the machine control system. If a fault is detected, a safe state shall be initiated or if this is not possible, a warning shall be given. | The loss of safety function is detected by the check. The occurrence of a fault can lead to the loss of safety function between the checking intervals. |
| 3 | The requirements of category B and the use of well tried safety principles apply. The system shall be designed so that a single fault in any of its parts does not lead to the loss of safety function. Where practicable, a single fault shall be detected. | When the single fault occurs, the safety function is always performed. Some but not all faults will be detected. An accumulation of undetected faults can lead to the loss of safety function. |
| 4 | The requirements of category B and the use of well tried safety principles apply. The system shall be designed so that a single fault in any of its parts does not lead to the loss of safety function. The single fault is detected at or before the next demand on the safety function. If this detection is not possible, then an accumulation of faults shall not lead to a loss of safety function. | When the. faults occur, the safety function is always performed. The faults will be detected in time to prevent the loss of safety functions. |

A heretofore known technology of an inverter device redundantly designed in order to comply with the category "3" is shown in FIGS. 4 to 6.

In a first heretofore known technology shown in FIG. 4, 100A is an inverter device, and 200 is a motor acting as a load. The inverter device 100A includes a control block 110A and a drive block (power source block) 120A.

A CPU 111, which generates IGBT gate signals, and a first shutdown circuit 112 disposed on the control block 110A, a second shutdown circuit 121, a drive photocoupler 122, and an IGBT bridge circuit 123 are disposed on the drive block 120A. The IGBT bridge circuit 123 with a three-phase bridge circuit formed of six bridge-connected IGBTs, the output terminals of the three phases are connected to the motor 200.

In the heretofore described configuration, normally, the gate signals generated by the CPU 111 pass through the first shutdown circuit 112 and are inputted into the drive photocoupler 122, and by the IGBTs of the IGBT bridge circuit 123 driven by output signals of the drive photocoupler 122, an alternating current voltage is applied to the motor 200. By this means, the motor 200 rotates.

Also, in the event that the need arises to stop the motor 200 due to an abnormality, a failure, or the like occurring, a shutdown signal from the exterior is inputted into the first and second shutdown circuits 112 and 121. Herein, as the shutdown signal, there is an output signal of a light curtain which optically detects that someone has approached a manufacturing line in which the motor 200 is installed, and the like.

As the gate signals and primary side power source of the drive photocoupler 122 are shutdown by the first and second shutdown circuits 112 and 121 operating in response to the shutdown signal, the motor 200 is reliably stopped.

By making the gate signal shutdown function redundant using the duplicate shutdown circuits 112 and 121 in this way, the safety of the system is maintained.

Furthermore, in a second heretofore known technology shown in FIG. 5, 100B is an inverter device and 200 is a motor, as previously described. The inverter device 100B includes a control block 110B and a drive block 120B.

A CPU 111, which generates IGBT gate signals, and first and second shutdown circuits 112 and 113 disposed on the control block 110B, a drive photocoupler 122 and an IGBT bridge circuit 123 are disposed on the drive block 120B.

In the heretofore described configuration, normally, the gate signals generated by the CPU 111 pass through the first and second shutdown circuits 112 and 113, and are inputted into the drive photocoupler 122, and by the IGBTs of the IGBT bridge circuit 123 driven by output signals of the drive photocoupler 122, an alternating current voltage is applied to the motor 200. By this means, the motor 200 rotates.

Also, when a shutdown signal from the exterior is inputted into the first and second shutdown circuits 112 and 113 on the control block 110B, the gate signals are shutdown by the first and second shutdown circuits 112 and 113 operating in response to the shutdown signal, meaning that the motor 200 is reliably stopped.

Also, even with this heretofore known technology, by making the gate signal shutdown function redundant by using the duplicate shutdown circuits 112 and 113 on the control block 110B, the safety of the system is maintained.

Furthermore, FIG. 6, which shows a third heretofore known technology, is the circuit illustrated in IEC61800-5-2, Annex B, FIG. B.3.

In FIG. 6, 100C is an inverter device, 120C is a drive block, 122 is a drive photocoupler, 122X is an upper arm photocoupler, 122Y is a lower arm photocoupler, and 123 is an IGBT bridge circuit.

Numeral 130, being a control block into which a shutdown signal a is inputted, includes a CPU 131, a first shutdown circuit 132, a memory 133, a clock generating circuit 134, and a photocoupler 122X power source shutdown transistor 135. 140, being a shutdown block into which a shutdown signal b is inputted, includes a second shutdown circuit 141, a watchdog timer 142, and a photocoupler 122Y power source shutdown transistor 143. Also, 136 is a shutdown confirmation circuit.

In the heretofore described configuration, normally, gate signals generated by the CPU 131 are inputted into the drive photocoupler 122, and by the upper and lower arm IGBTs of the IGBT bridge circuit 123 being driven by output signals of the drive photocoupler 122, an alternating current voltage is applied to the motor 200. By this means, the motor 200 rotates.

When the shutdown signal a from the exterior is inputted into the first shutdown circuit 132 in the control block 130, the power source of the upper arm photocoupler 122X is shutdown by a shutdown command a' sent to the CPU 131, and the CPU 131 turns off the transistor 135. Also, when the shutdown signal b from the exterior is inputted into the second shutdown circuit 141 in the shutdown block 140, the power source of the lower arm photocoupler 122Y is shutdown by the transistor 143 being directly turned off by a shutdown command b'.

The configuration is such that, when the shutdown commands a' and b' are input into the CPU 131, the IGBT gate signals themselves are also shutdown.

Furthermore, actuation signals of the transistors 135 and 143 are fed back to the CPU 131, and at a time of the shutdown operation, the CPU 131 issues a command, and a shutdown confirmation signal is output from the shutdown confirmation circuit 136.

According to this heretofore known technology, as the power source of the drive photocoupler 122 and the IGBT gate signals are shutdown, the motor 200 is reliably stopped.

In JP-A-09-238476 (Paragraphs [0011] to [0023], FIG. 1, and the like), a technology is disclosed wherein, in an abnormality detection and protection circuit of semiconductor elements which configure a power bridge circuit, as well as various kinds of abnormality (a load short circuit, an overcurrent flowing to the semiconductor elements, or a drop in a control power source voltage) being detected by category, stored, and the switching of the semiconductor elements being stopped, the abnormalities are reported to an integrated control system.

With the first and third heretofore known technologies, a passing of a shutdown signal from the control block 110A to the drive block 120A, or from the control block 130 and shutdown block 140 to the drive block 120C, is necessary. For this reason, the number of pins of a connector for carrying out the passing of the shutdown signal increases, and the circuit becomes complicated. Also, with the first heretofore known technology, it is necessary to mount the shutdown circuit 121 on the drive block 120A, and the drive block 120A increases in size.

With the second heretofore known technology, as the two shutdown circuits 112 and 113 are mounted on the control block 110B, the configuration of the shutdown circuits is complete within the control block 110B, thus, it is possible to simplify the circuit configuration of the drive block 120B.

However, in the event that, for example, the IGBT bridge circuit 123 has three phases, six gate signals are generated by the CPU 111 and, as the gate signals have to be input into and output from the shutdown circuits 112 and 113, the wiring becomes complicated. Also, there is a problem in that the mounting area of the shutdown circuits on the control block 110B increases, and the block as a whole increases in size.

With the heretofore known technology described in JP-A-09-238476 (Paragraphs [0011] to [0023], FIG. 1, and the like), as the number of abnormality detection circuits, abnormality storage circuits, and the like, needs to coincide with the number of varieties of abnormality, there is a problem in that this leads to more complicated and larger circuit configuration.

Therein, an object of the invention is to enable a simplification of a circuit configuration, and a miniaturization of the circuit as a whole, in an inverter device wherein a shutdown function is made redundant in order to satisfy the safety standards of the European Norm "EN954-1", and the like.

Further objects and advantages of the invention will be apparent from the following description of the invention.

SUMMARY OF THE INVENTION

In order to achieve the heretofore described object, an inverter device according to an aspect of the invention includes a bridge circuit formed of bridge-connected semiconductor switching elements such as IGBTs, a drive block, and a control block.

Herein, the drive block has an upper arm photocoupler and lower arm photocoupler which output drive signals (gate signals) for turning on and off upper arm switching elements and lower arm switching elements respectively. Also, the control block includes a drive signal generating circuit, such as a CPU, which generates the drive signals and supplies them to the upper arm photocoupler and lower arm photocoupler. The control block includes an upper arm shutdown circuit and lower arm shutdown circuit which individually shutdown the drive signals of the upper arm switching elements and the drive signals of the lower arm switching elements in accordance with shutdown signals input from the exterior. Herein, the upper arm shutdown circuit and lower arm shutdown circuit are configured in such a way as to carry out a shutdown operation in accordance with the shutdown signals, which have mutually inverted logics.

As the upper arm shutdown circuit and lower arm shutdown circuit are connected between the drive signal generating circuit and the upper arm photocoupler and lower arm photocoupler, they are made redundant in such a way as to shutdown at least the drive signals of the upper arm switching elements or the drive signals of the lower arm switching elements.

It is desirable that a failure detection circuit is connected on the output side of the upper arm shutdown circuit and lower arm shutdown circuit, and that an output signal of the failure detection circuit is fed back to the drive signal generating circuit. Also, it is desirable that the drive signal generating circuit outputs to the exterior a failure detection signal generated based on the output signal of the failure detection circuit.

It is preferable that the failure detection circuit includes a wired OR circuit formed of, for example, diodes, each being connected between the output side of the upper arm shutdown circuit and lower arm shutdown circuit and a direct current power source, and that an output signal of the wired OR circuit is fed back to the drive signal generating circuit.

According to the invention, by mounting the upper arm shutdown circuit and lower arm shutdown circuit on the control block, it is possible to culminate the shutdown function within the control block, and there is no danger of the circuit configuration of the drive block becoming complicated or increasing in size. Also, as it is possible, by replacing only the control block, to configure an inverter device which is compliant, or non-compliant, with safety standards, it is possible to flexibly provide a product in accordance with required safety specifications.

Furthermore, by reducing the number of drive signals which need to be shutdown, it is possible to achieve a simplification of the circuit configuration and a reduction in the number of wires.

Also, by using shutdown signals with mutually inverted logics to operate the upper arm shutdown circuit and lower arm shutdown circuit, it is possible to further increase the safety of the inverter device by utilizing a safety torque off (STO) function, which reliably stops the motor, even in the event of a short circuit failure between the upper and lower arm shutdown signals.

BRIEF DESCRIPTION OF THE DRAWINGS

FIG. 3A is a time chart showing a shutdown operation at a normal time in the working example.

DETAILED DESCRIPTION OF PREFERRED EMBODIMENTS

Figure 1:
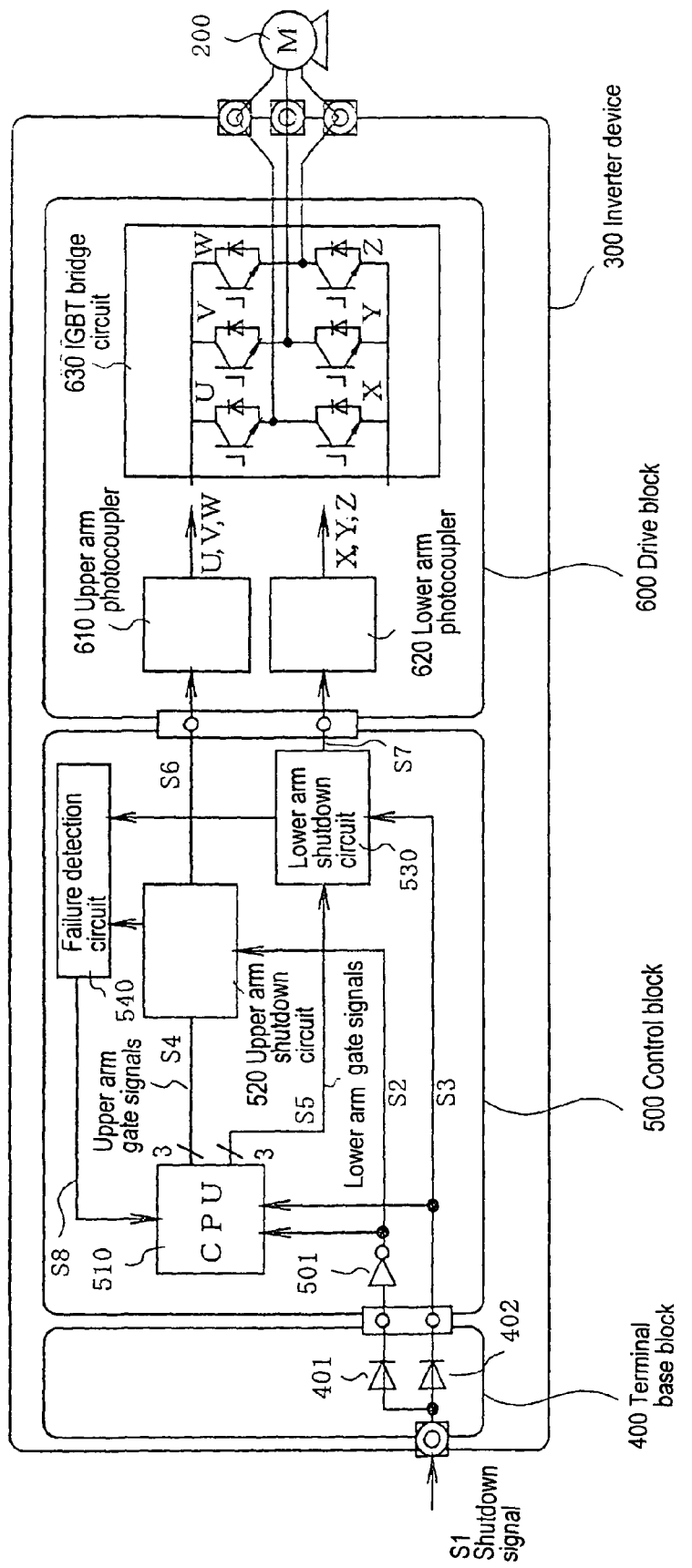
FIG. 1 is a block diagram showing an embodiment of the invention.

Hereinafter, a description will be given, based on the drawings, of an embodiment of the invention. FIG. 1 is a block diagram showing a configuration of the embodiment.

In FIG. 1, 300 is an inverter device which drives a motor 200 acting as a load. The inverter device 300 includes a terminal base block 400, a control block 500, and a drive block 600.

Signal input elements 401 and 402, for dividing a shutdown signal S1 from the exterior into two and inputting them into the control block 500, are provided on the terminal base block 400. In FIG. 1, the signal input elements 401 and 402 are displayed as diodes.

An inverting circuit 501, which inverts the logic of one of the shutdown signals S1, is provided on the control block 500, and an output signal S2 of the inverting circuit 501 is input into a CPU 510, acting as a drive signal generating circuit, and an upper arm shutdown circuit 520. Also, the other shutdown signal S1 is inputted into the CPU 510, and a lower arm shutdown circuit 530, as a signal S3 with an unchanged logic.

Herein, the signals S2 and S3 are also called shutdown signals, in the same way as the signal S1.

Three upper arm gate signals S4 are outputted from the CPU 510. The gate signals S4 pass through the upper arm shutdown circuit 520, and are inputted as gate signals S6 into an upper arm photocoupler 610 included in the drive block 600. In the same way, three lower arm gate signals S5 are outputted from the CPU 510. The gate signals S5 pass through the lower arm shutdown circuit 530, and are inputted as gate signals S7 into a lower arm photocoupler 620 included in the drive block 600.

Also, a failure detection circuit 540 is connected to each of the shutdown circuits 520 and 530, and an output signal (feedback signal) S8 of the failure detection circuit 540 is inputted into the CPU 510. Herein, a failure refers to, for example, the kind of condition wherein the shutdown signal S2 or S3, gate signals S6 or S7, or feedback signal S8 is fixed unchanged at a low level or high level.

The drive block 600 includes the photocouplers 610 and 620, and a three-phase IGBT bridge circuit 630, the upper arm photocoupler 610 outputs gate signals to upper arm IGBTs U, V, and W, which configure the IGBT bridge circuit 630, and the lower arm photocoupler 620 outputs gate signals to lower arm IGBTs X, Y, and Z.

In the embodiment, a case is shown in which IGBTs are used as semiconductor switching elements, but FETs or other semiconductor switching elements may also be used. Also, in the embodiment, the IGBT bridge circuit 630 is mounted on the drive block 600 together with the upper and lower arm photocouplers 610 and 620, but the IGBT bridge circuit 630 may also be mounted on a block separate from the drive block 600.

WORKING EXAMPLE 1

Figure 2:
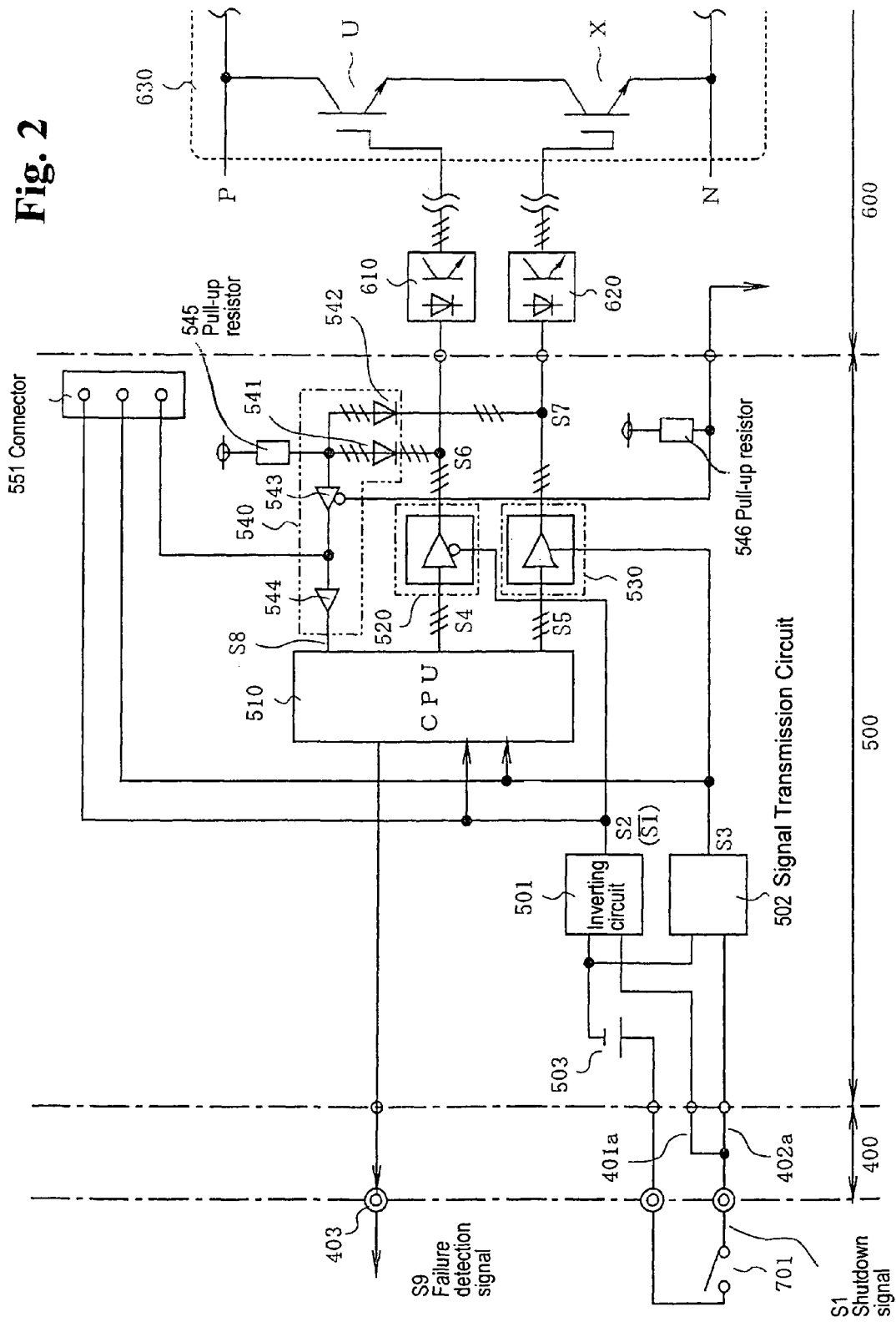
FIG. 2 is a circuit diagram showing a working example of the invention.

Next, FIG. 2 is a circuit diagram of a specific working example of the heretofore described embodiment. In FIG. 2, the same numbers are given to components corresponding to the blocks depicted in FIG. 1.

In FIG. 2, 701 being a switch which causes the shutdown signal S1 to be emitted, it is, for example, a switch of a light curtain which detects the fact that someone has approached a manufacturing line, as previously described. One end of the switch 701 is connected to a direct current power source 503 included in the control block 500, and by the switch 701, which is normally turned on, being turned off, the shutdown signals S1 are inputted into the control block 500 via the terminal base block 400.

401a and 402a included in the terminal base block 400 are signal lines corresponding to the signal input elements 401 and 402.

On the control block 500, 501 is an inverting circuit which inverts one of the shutdown signals S1, and the shutdown signal S2 outputted from the inverting circuit 501 is inputted into the CPU 510 and upper arm shutdown circuit 520. Numeral 502 is a signal transmission circuit which transmits the other shutdown signal S1 with an unchanged logic, and the shutdown signal S3 outputted from the signal transmission circuit 502 is inputted into the CPU 510 and lower arm shutdown circuit 530.

Herein, the inverting circuit 501 and signal transmission circuit 502 can be configured using, for example, photocouplers.

A connector 551 is connected on the output side of the inverting circuit 501 and signal transmission circuit 502. The connector 551 is for transmitting the shutdown signals S2 and S3, and the feedback signal S8, to the exterior.

As also illustrated in FIG. 1, the three upper arm gate signals S4, and three lower arm gate signals S5, from the CPU 510 are inputted into the upper arm shutdown circuit 520 and lower arm shutdown circuit 530 respectively. Each of the shutdown circuits 520 and 530 is formed of, for example, a three state buffer with an output enable gate, and a circuit wherein the enable gate is active low (negative logic) configures the upper arm shutdown circuit 520, while a circuit wherein the enable gate is active high (positive logic) configures the lower arm shutdown circuit 530.

The gate signals S6 outputted from the upper arm shutdown circuit 520 are inputted into the upper arm photocoupler 610 included in the drive block 600, and the gate signals S7 outputted from the lower arm shutdown circuit 530 are inputted into the lower arm photocoupler 620.

The gate signals outputted from the upper arm photocoupler 610 are applied to the upper arm IGBTs U, V, and W in the IGBT bridge circuit 630, and the gate signals outputted from the lower arm photocoupler 620 are applied to the lower arm IGBTs X, Y, and Z. In FIG. 2, only one phase of the three phases, the IGBTs U and X, is shown, and the other phases of IGBTs are omitted.

The failure detection circuit 540 is connected on the output side of each of the shutdown circuits 520 and 530, and the feedback signal S8, which is the output signal of the failure detection circuit 540, is inputted into the CPU 510.

The failure detection circuit 540 includes, for example, diodes 541 and 542 which configure a wired OR circuit. The anodes of the diodes 541 and 542, being commonly connected, are connected to a direct current power source via a pull-up resistor 545. Also, the cathode of the diode 541 is connected to the output terminal of the upper arm shutdown circuit 520, and the cathode of the diode 542 is connected to the output terminal of the lower arm shutdown circuit 530.

The anodes of the diodes 541 and 542 are connected to the feedback signal input terminal of the CPU 510 via a three-state buffer 543 and a buffer 544. The enable gate of the three-state buffer 543 is connected to a direct current power source via a pull-up resistor 546.

The CPU 510 generates a failure detection signal S9 based on the feedback signal S8, and the failure detection signal S9 is outputted to the exterior from an output terminal 403 of the terminal base block 400.

Next, a description will be given of an operation of the working example, while referring to the time charts of FIGS. 3A to 3C.

For example, during the operation of the motor 200 by the inverter device 300, when it is detected by the light curtain that someone has approached the manufacturing line, the switch 701 is turned off. Together with this, the shutdown signals S1 are inputted into the inverting circuit 501 and signal transmission circuit 502.

At this time, the shutdown signals S2 and S3, with mutually inverted logics, are emitted from the inverting circuit 501 and signal transmission circuit 502 respectively, the shutdown signal S2 is inputted into the enable gate of the upper arm shutdown circuit 520, and the shutdown signal S3 into the enable gate of the lower arm shutdown circuit 530.

For this reason, the output side of each of the shutdown circuits 520 and 530 is of a high impedance, and the output terminal of each of the shutdown circuits 520 and 530 is essentially isolated from the upper arm photocoupler 610 and lower arm photocoupler 620, meaning that the upper arm and lower arm gate signals S6 and S7 stop to be inputted into the photocouplers 610 and 620.

Consequently, when there is no failure in the inverting circuit 501, signal transmission circuit 502, shutdown circuits 520 and 530, or the like, and each of them is operating normally, all of the IGBTs U, V, W, X, Y, and Z in the IGBT bridge circuit 630 are turned off, and the operation of the IGBT bridge circuit 630, by extension the operation of the motor 200, is stopped.

Also, even in the event that, for example, there is a failure in the upper arm shutdown circuit 520, provided that the lower arm shutdown circuit 530 operates normally, all of the gate signals S7 to the lower arm IGBTs X, Y, and Z are shutdown, meaning that the operation of the IGBT bridge circuit 630 and motor 200 is reliably stopped. By making the gate signal shutdown function redundant in this way, it is possible to increase the safety performance of the system.

FIG. 3A is a time chart showing the heretofore described shutdown operation, wherein the gate signals S4 to S7 are displayed as PWM signals.

Next, as one example of a failure of the circuit, a description will be given of an operation when a failure occurs wherein the shutdown signal S2 to the upper arm shutdown circuit 520 is fixed unchanged at the low level.

Figure 3B:
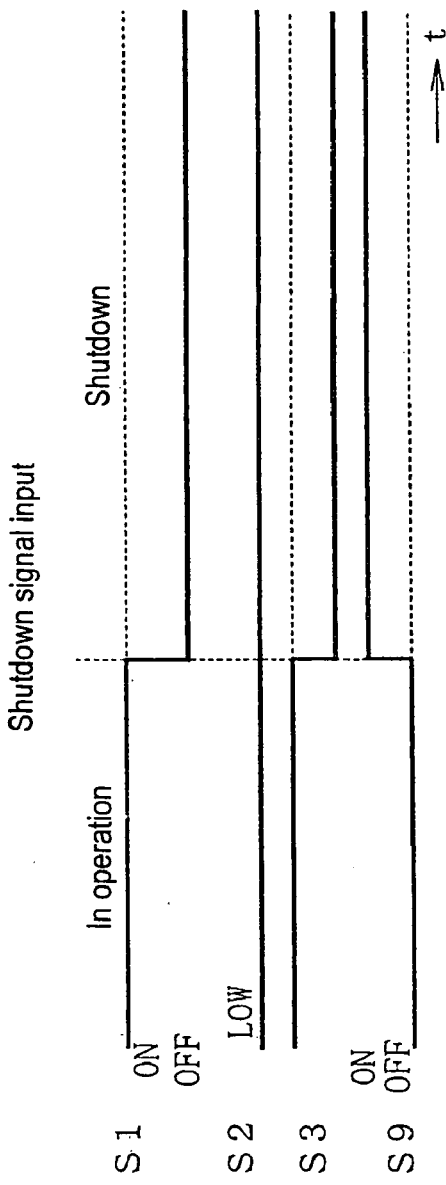
FIG. 3B is a time chart showing an operation at a time of a shutdown in the working example.
Figure 3C:
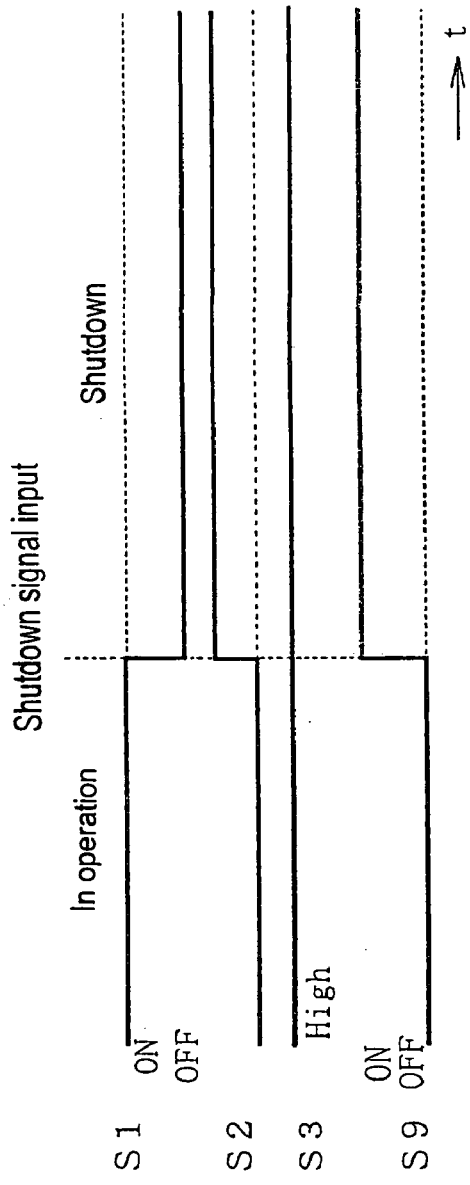
FIG. 3C is a time chart showing an operation at a time of a shutdown in the working example.
Figure 4:
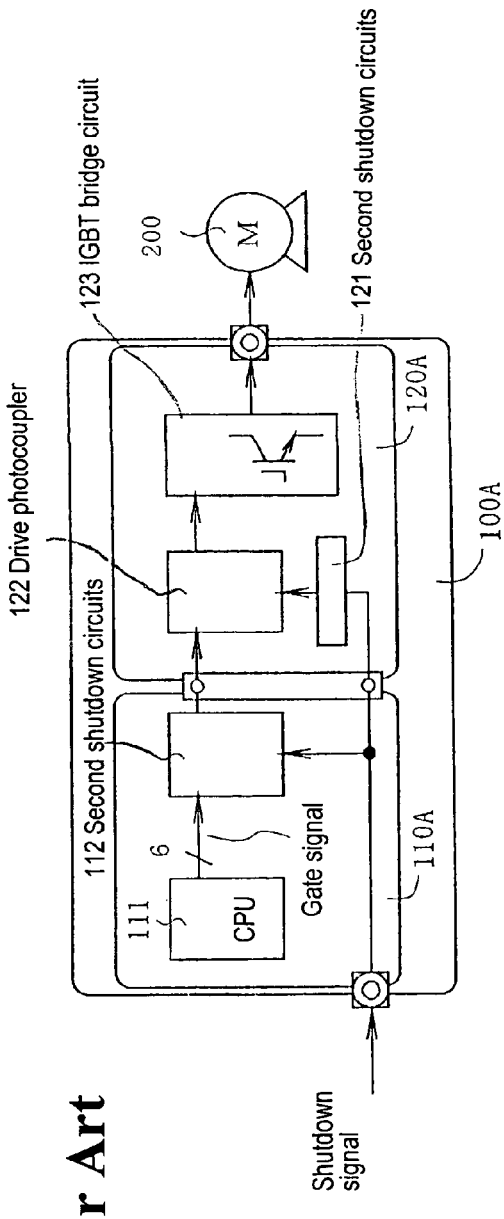
FIG. 4 is a block diagram showing a first heretofore known technology.

As shown in FIG. 3A, the shutdown signal S2 should normally invert from the low level to the high level due to the input of the shutdown signal S1. However, in the event that, for example, a short circuit failure occurs between the shutdown signals S2 and S3, and the level of the shutdown signal S2 is pulled down to the level of the shutdown signal S3, the shutdown signal S2 is fixed unchanged at the low level, as shown in FIG. 3B.

In this case, as the upper arm shutdown circuit 520 is active low, the gate signals S6 are outputted, but as the other, normal shutdown signal S3 (low level) is inputted into the lower arm shutdown circuit 530, the gate signals S7 to the lower arm IGBTs shutdown, in the same way as in FIG. 3A. Consequently, even in the event that a short circuit failure occurs between the shutdown signals S2 and S3, it is possible to realize a safety torque off (STO) function which eliminates the torque of the motor, without being affected by the short circuit failure. At the same time, a high level feedback signal S8 is inputted into the CPU 510 from the failure detection circuit 540, and the CPU 510, based on the feedback signal S8 and shutdown signals S2 and S3, turns on the failure detection signal S9 and outputs it to the exterior, as shown in FIG. 3B.

As another example of a failure of the circuit, a description will be given of an operation when a short circuit failure occurs between the shutdown signals S2 and S3, the level of the shutdown signal S3 is pulled up to the level of the shutdown signal S2, and the shutdown signal S3 to the lower arm shutdown circuit 530 is fixed unchanged at the high level.

As shown in FIG. 3A, the shutdown signal S3 should normally invert from the high level to the low level due to the input of the shutdown signal S1. However, as shown in FIG. 3C, the shutdown signal S3 is fixed unchanged at the high level.

In this case, as the lower arm shutdown circuit 530 is active high, the gate signals S7 are outputted, but as the other, normal shutdown signal S2 (high level) is inputted into the upper arm shutdown circuit 520, the gate signals S6 to the upper arm IGBTs shutdown, in the same way as in FIG. 3A. Consequently, even in the event that a short circuit failure occurs between the shutdown signals S2 and S3, it is possible to realize the safety torque off (STO) function which eliminates the torque of the motor, without being affected by the short circuit failure. At the same time, the high level feedback signal S8 is inputted into the CPU 510 from the failure detection circuit 540, and the CPU 510, based on the feedback signal S8 and shutdown signals S2 and S3, turns on the failure detection signal S9 and outputs it to the exterior, as shown in FIG. 3C.

Although a detailed description will not be given, even in the kind of case in which the gate signals S6 or S7, or feedback signal S8, are fixed at the high level or low level, it is possible to detect the failure with the failure detection circuit 540 and CPU 510.

According to the working example, by mounting the upper arm shutdown circuit 520 and lower arm shutdown circuit 530 on the control block 500, it is possible to culminate the shutdown function within the control block 500, and there is no danger of the circuit configuration of the drive block 600 becoming complicated or increasing in size. Also, as it is possible, by replacing only the control block 500, to configure an inverter device which complies with the safety standards of European Norm "EN954-1" and the like, and an inverter device which does not comply with the safety standards, it is possible to flexibly provide a product in accordance with required safety specifications.

Figure 5:
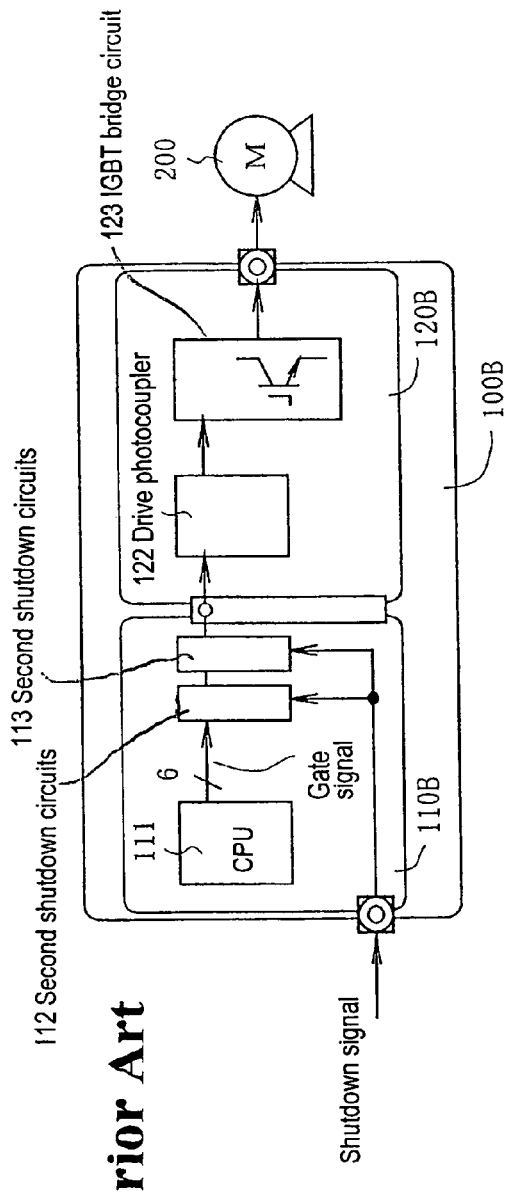
FIG. 5 is a block diagram showing a second heretofore known technology.
Figure 6:
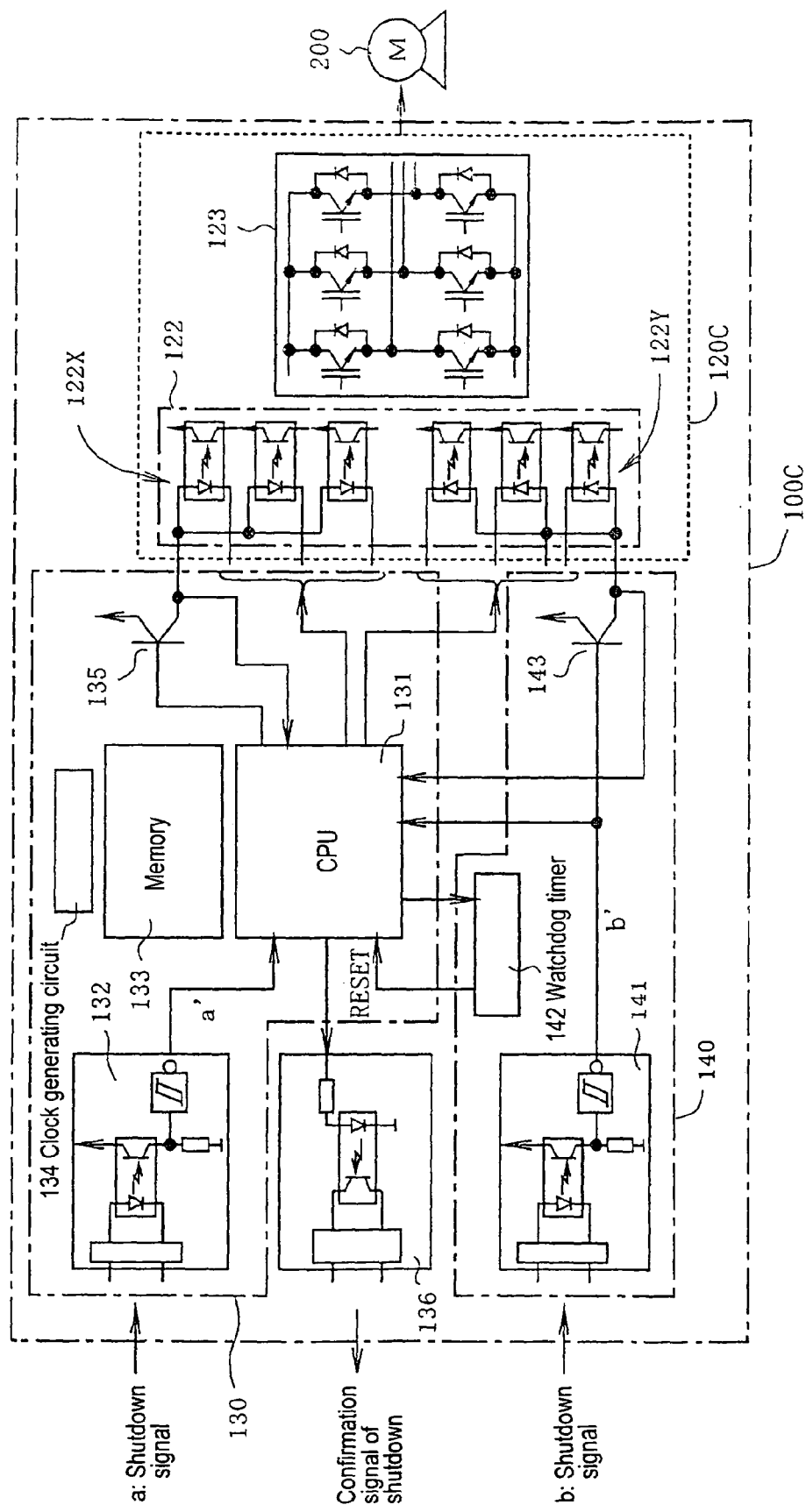
FIG. 6 is a block diagram showing a third heretofore known technology.

Furthermore, in the case of, for example, a three-phase inverter device, it is sufficient, in order to realize the safety torque off (STO) function which eliminates the torque of the motor, that the upper arm and lower arm shutdown circuits 520 and 530 each shutdown three gate signals (a total of six). That is, with the previously described heretofore known technology of FIG. 5, six gate signals (a total of twelve) are shutdown by each of the duplicate shutdown circuits 112 and 113, whereas with the working example, as the number of signals is reduced by half, it is possible to simplify the shutdown circuits and wiring.

Also, in FIGS. 1 and 2, as the shutdown circuits 520 and 530 are used to operate the shutdown signals S2 and S3 with mutually inverted logics, it is possible to further increase the safety of the inverter device by utilizing the safety torque off (STO) function, which reliably stops the motor by shutdown of the gate signals, without being affected by a short circuit failure of the shutdown signals S2 and S3.

The invention is applicable regardless of the number of phases of the inverter device, and can be applied in, for example, a three-phase inverter or single-phase inverter. Also, not being limited to the case of driving a motor on a factory manufacturing line, the invention can be utilized in inverter devices which drive various kinds of load for industrial use or domestic use.

The disclosure of Japanese Patent Application No. 2009-136878 filed on. Jun. 8, 2009 is incorporated as a reference.

While the invention has been explained with reference to the specific embodiments of the invention, the explanation is illustrative and the invention is limited only by the appended claims.

What is claimed is:

1. An inverter device, comprising:
   a bridge circuit formed of a plurality of bridge-connected semiconductor switching elements having upper and lower arm semiconductor switching elements;
   a drive block having an upper arm photocoupler and a lower arm photocoupler which output drive signals for turning on and off the upper arm semiconductor switching elements and the lower arm semiconductor switching elements of the bridge circuit, respectively; and
   a control block including a drive signal generating circuit which generates the drive signals and supplies them to the upper arm photocoupler and the lower arm photocoupler,
   wherein the control block includes an upper arm shutdown circuit and a lower arm shutdown circuit which individually shutdown the drive signals of the upper arm semiconductor switching elements and the drive signals of the lower arm semiconductor switching elements in accordance with shutdown signals inputted from an exterior, and
   the upper arm shutdown circuit and the lower arm shutdown circuit carry out a shutdown operation in accordance with the shutdown signals, which have mutually inverted logics.

2. The inverter device according to claim 1, wherein the upper arm shutdown circuit and the lower arm shutdown circuit are connected between the drive signal generating circuit and the upper arm photocoupler and the lower arm photocoupler.

3. The inverter device according to claim 2, further comprising a failure detection circuit connected at an output side of the upper arm shutdown circuit and the lower arm shutdown circuit, and an output signal of the failure detection circuit is fed back to the drive signal generating circuit.

4. The inverter device according to claim 3, wherein the drive signal generating circuit outputs to the exterior a failure detection signal generated based on the output signal of the failure detection circuit.

5. The inverter device according to claim 3, wherein the failure detection circuit includes a wired OR circuit connected between the output side of the upper arm shutdown circuit and the lower arm shutdown circuit and a direct current power source, and an output signal of the wired OR circuit is fed back to the drive signal generating circuit.

* * * * *